Sept. 14, 1937.  W. SONSALLA  2,093,141
HYDRAULIC WEIGHING DEVICE
Filed April 11, 1934

INVENTOR:
Waldemar Sonsalla
BY
ATTORNEY.

Patented Sept. 14, 1937

2,093,141

UNITED STATES PATENT OFFICE 2,093,141

HYDRAULIC WEIGHING DEVICE

Waldemar Sonsalla, Berlin, Germany

Application April 11, 1934, Serial No. 720,126
In Germany April 28, 1933

7 Claims. (Cl. 265—47)

This invention relates to a hydraulic weighing device, in which the load acts on several separate fluid pressure chambers the pressure in which is transmitted by separate pipings to a number of auxiliary pistons which jointly influence the same indicating device.

The known devices of this class have the drawback that the transmission of power from the individual chambers to the auxiliary pistons can be disturbed by losses due to leakage and friction or to other causes and thus errors occur in indicating the result of the weighing process.

It was hitherto customary to dispense with the interposition of auxiliary pistons in hydraulic weighing devices provided with diaphragms and to connect the indicating device directly with the conduit system which united all individual chambers. A construction of this kind, however, will permit a reliable ascertainment of weight only if the center of gravity of the load is located exactly above the center of the weighing table so as to insure absolute uniformity in the loading of all chambers, but this condition cannot be fulfilled as a rule. In any case, in weighing devices of the kind described, which operate with auxiliary pistons, diaphragms have hitherto not been employed for the individual chambers and under the auxiliary pistons, so that the advantages attainable thereby could not be utilized. The arrangement of diaphragms under the auxiliary pistons is rendered particularly difficult by the fact that a plurality of these pistons must act on a common indicating device without affecting thereby the accuracy of the weighing process.

The invention solves this problem by employing, in known manner, diaphragms above the pressure chambers of the carrying pistons of the individual scales and, for the purpose of providing similar diaphragms above the pressure chambers on which the other pistons act, transmitting the motion of the auxiliary pistons to a measuring gauge piston by means of rods disposed outside the coaxially arranged pressure chambers.

Figure 1:
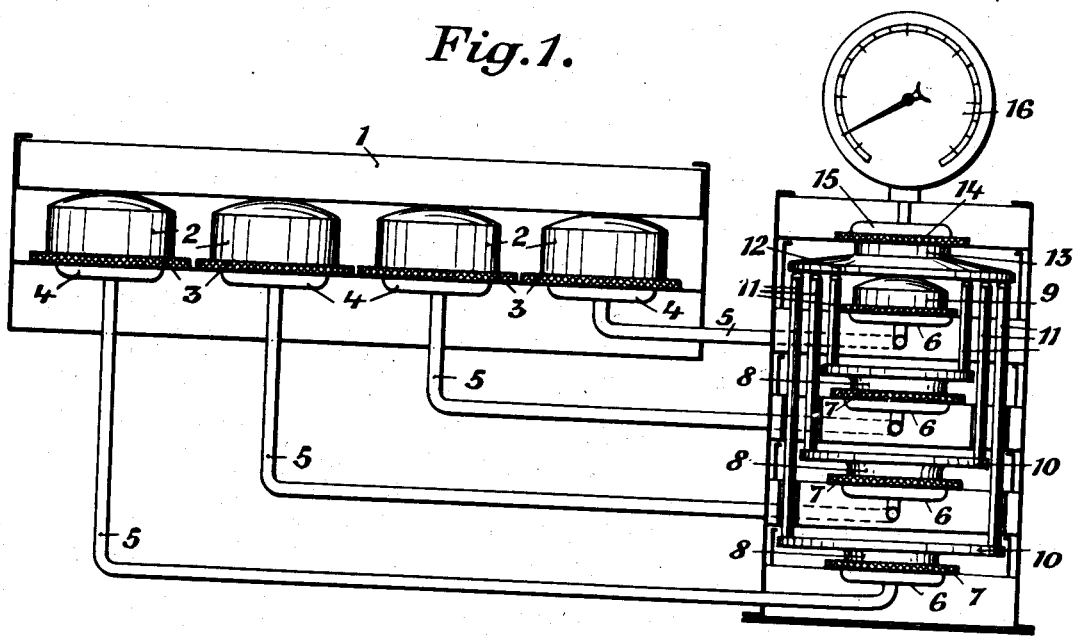
Figure 2:
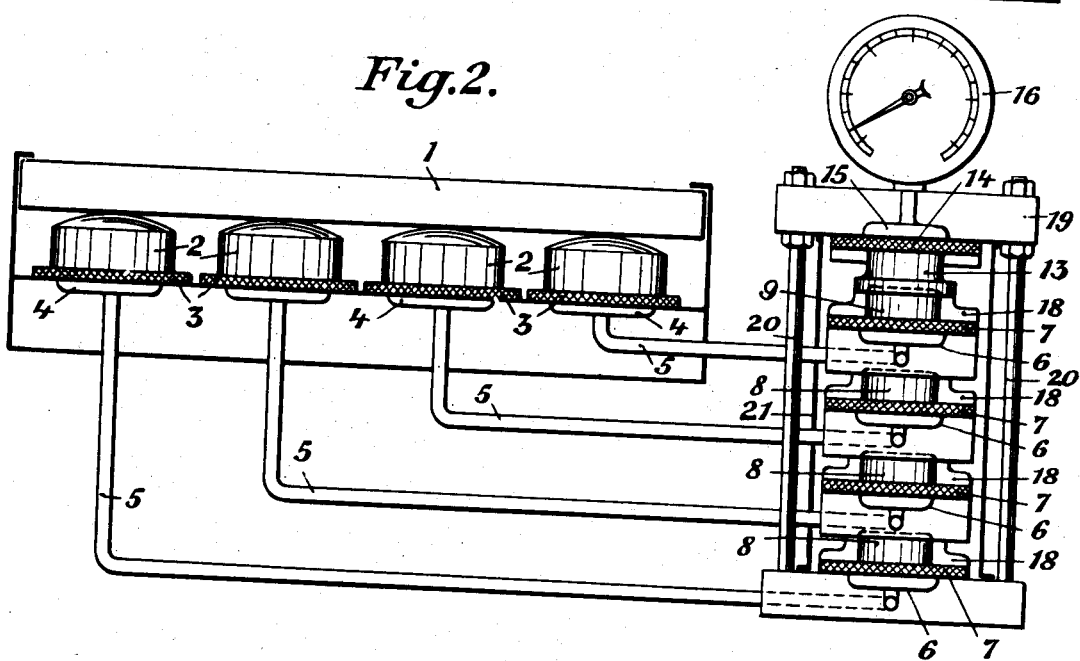

By way of example, the invention is illustrated in the accompanying drawing, in which Figure 1 is a diagrammatic side view of the weighing device, and Figure 2 is a similar view of a modified form.

Referring to the drawing, the table or plate 1 for receiving the load rests on a plurality of carrying pistons 2, each of which is supported by a diaphragm 3 shutting off the top of a pressure oil chamber 4. Each pressure oil space or chamber 4 is connected with a second pressure oil space 6 by a pressure oil conduit 5.

The chambers 6 are arranged vertically above one another and closed on top by the diaphragms 7, each of which carries an auxiliary piston 8 or 9. The auxiliary pistons 8 each contact one of the chambers 6 while the auxiliary piston 9 is the uppermost one and contacts with the transmission plate 12 and the piston 13. The auxiliary pistons 8 and 9 are provided at several points with lateral projections 10 which balance one another and which carry the supporting rods 11. The supporting rods 11 of all auxiliary pistons 8 extend up to the transmission plate 12 of the measuring gauge piston 13 which abuts from below against the diaphragm 14 shutting off the pressure oil chamber 15 underneath. The chamber 15 is connected with a manometer 16 in known manner.

It will be evident from the foregoing description that a load placed on the plate 1 will be transmitted by means of the pistons 2 more or less uniformly, though usually to different extents, to the diaphragms 3, and then act through the hydraulic connecting conduits 5 on the auxiliary pistons 8 and 9 which will thus be lifted. The lifting power is then transmitted by the rods 11 to the measuring gauge piston 13 and summed up and indicated by the manometer 16, it being immaterial whether one piston 2 or several or all of them are affected by the loading of the plate 1. Those auxiliary pistons 8 and 9 whose carrying pistons 2 remain unloaded are not affected by the weighing process and do not exert pressure upon the measuring gauge piston 13 during the ascent of the latter, which is an important feature, as the sensitiveness of the weighing device and the accuracy of weight indication, especially in case of small loads, are increased thereby.

The device just described affords the considerable advantage that losses due to leaks are excluded or, at least, cannot make themselves felt to a disturbing degree.

According to the invention, the construction described can further be considerably simplified and improved as to measuring accuracy by employing the auxiliary pressure spaces themselves for transmitting the pressure oil forces effective therein to the measuring gauge piston.

In this case (Fig. 2), the weighing table or plate 1 rests as before on the carrying pistons 2 which transmit the load through the diaphragms 3 to the fluid in the pressure oil chambers 4. The latter transmit the pressure by means of the conduits 5 to the pressure fluid filled into the auxiliary chambers 6 which are coaxially arranged. Each chamber 6 is closed on top by a diaphragm 7 on which an auxiliary piston 8 rests. The diaphragms 7 are secured to the chambers 6 by the holding rings 18, and the pistons 8 are approximately as high as the holding rings 18 and guided in the latter, the general arrangement being such that after the plate 1 is relieved the chambers 6 are directly supported by the holding rings 18 disposed underneath them. If the plate 1 is loaded, the individual pistons 8 will rise in accordance with the hydraulic forces that are effective in the pressure oil chambers disposed underneath them, and will then lift the superposed auxiliary chambers 6 off from the holding rings 18. In other words, the hydraulic forces effective in the various auxiliary chambers 6 will be transmitted by the pistons disposed above their respective diaphragms to the next higher auxiliary chamber 6 and by the latter to the superposed parts of the measuring device.

The uppermost auxiliary piston 9 transmits all the forces acting on it to the directly superposed measuring gauge piston 13, which in turn transmits the total force through the diaphragm 14 to the pressure medium in the pressure oil chamber 13 of the head piece 19 and thus causes the indication thereof by the instrument 16.

Foundation bolts 20 connecting the head piece 19 with the lowermost auxiliary chamber 6 serving also as base insure lasting union of the parts and further permit the maintenance of a certain initial pressure in the pressure oil chamber 15 whereby the pointer of the manometer 16 is placed in zero position.

To prevent lateral displacements of the auxiliary chambers 6 relative to one another it is advisable to have the holding rings 18 engage corresponding depressions in the superposed auxiliary chambers 6 or the piston 13.

The connecting conduits 5 are wholly or partly flexible or articulated so as to be able to follow displacements of the auxiliary chambers 6. All auxiliary chambers 6 are surrounded by a common sheet metal cylinder 21.

I claim:—

1. A hydraulic weighing device, comprising, a load receiving plate, a plurality of pistons for sustaining said plate, a fluid pressure chamber under each piston, a diaphragm for closing the top of each pressure chamber and supporting one of said pistons, auxiliary fluid pressure chambers arranged vertically above one another, conduits connecting each of said first fluid pressure chambers with one of said auxiliary fluid pressure chambers, a diaphragm for closing the top of each auxiliary fluid pressure chamber, an auxiliary piston having lateral projections and being carried by each of said second-mentioned diaphragms, a measuring gauge piston abutting against the uppermost auxiliary fluid pressure chamber, said measuring piston being coaxial with said auxiliary fluid pressure chambers, rods disposed on the projections of said auxiliary pistons and connecting the latter with said measuring piston to transmit thereto the power raising said auxiliary pistons, and a manometer connected with said uppermost pressure chamber for indicating the power raising said auxiliary pistons.

2. A hydraulic weighing device, comprising, a load receiving plate, a plurality of pistons for sustaining said plate, a fluid pressure chamber under each piston, a diaphragm for closing the top of each pressure chamber and supporting one of said pistons, coaxially arranged auxiliary fluid pressure chambers, corresponding in number to the sustaining pressure chambers, conduits connecting said sustaining pressure chambers and transmitting the pressure exerted by a load to said auxiliary chambers, diaphragms for closing the top of each auxiliary pressure chamber, separately movable pistons on said diaphragms, holding rings for securing said diaphragms to said auxiliary pressure chambers, said pistons being approximately equal in height to said rings and guided therein and in contact with the auxiliary fluid pressure chamber disposed above them, a measuring gauge piston to which the pressure exerted by a load is transmitted by the uppermost separately movable piston, said measuring gauge piston abutting against the diaphragm shutting off the fluid pressure space disposed on top of the device, a manometer connected with said topmost fluid pressure space for indicating the pressure exerted by the load, and means for maintaining the separately movable pistons coaxial.

3. A hydraulic weighing device according to claim 2, in which the holding rings engage depressions of superposed auxiliary fluid pressure chambers to prevent lateral displacement of the latter.

4. Hydraulic weighing device comprising a load receiving plate, a plurality of pistons for sustaining said plate, a fluid pressure chamber under each piston, a diaphragm for closing the top of each pressure chamber and each supporting one of said pistons, auxiliary fluid pressure chambers corresponding in number to the sustaining pressure chambers and arranged vertically above one another, conduits connecting each sustaining pressure chamber with one of said auxiliary fluid pressure chambers, a diaphragm for closing the top of each auxiliary fluid pressure chamber, separately movable pistons one being carried by each of said second-mentioned diaphragms, a measuring gauge piston coaxial with said auxiliary pressure chambers and abutting against the uppermost auxiliary piston, means to transmit thrust from each of the other said auxiliary pistons to said measuring gauge piston, a measuring gauge pressure chamber for said measuring gauge piston, a manometer connected with said measuring gauge pressure chamber for indicating the power required to raise said auxiliary pistons, and means for maintaining the separate auxiliary pistons co-axial.

5. A hydraulic weighing device according to claim 4, in which the thrust means comprise rods arranged in pitch circles of stepwise diminished diameter from the lowest to the uppermost auxiliary piston, whereby the rods of each auxiliary piston lie clear of the next above piston.

6. A hydraulic weighing device according to claim 4, in which the thrust means comprise rods attached to the auxiliary pistons and abutting freely against the measuring piston, and in which the auxiliary fluid pressure chambers are mounted in a housing having guide means for the rods.

7. A hydraulic weighing device according to claim 4, in which the thrust means comprise rods attached to the auxiliary pistons and abutting freely against the measuring piston.

WALDEMAR SONSALLA.